United States Patent
Lee et al.

(10) Patent No.: US 11,558,776 B2
(45) Date of Patent: Jan. 17, 2023

(54) DEVICES AND SYSTEM FOR TRANSMITTING AND RECEIVING COMPRESSED BITSTREAM VIA WIRELESS STREAM AND HANDLING TRANSMISSION ERROR

(71) Applicant: LG ELECTRONICS INC., Seoul (KR)

(72) Inventors: Sangheon Lee, Seoul (KR); Yoonjung Kim, Seoul (KR); Jonghun Yoo, Seoul (KR); Jaehyeok Lee, Seoul (KR); Taeil Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 16/631,401

(22) PCT Filed: May 7, 2019

(86) PCT No.: PCT/KR2019/005418
§ 371 (c)(1),
(2) Date: Jan. 15, 2020

(87) PCT Pub. No.: WO2020/204251
PCT Pub. Date: Oct. 8, 2020

(65) Prior Publication Data
US 2021/0243644 A1 Aug. 5, 2021

(30) Foreign Application Priority Data
Mar. 29, 2019 (KR) .................. 10-2019-0037333

(51) Int. Cl.
*H04W 28/06* (2009.01)
*H04L 1/16* (2006.01)
*H04L 65/61* (2022.01)

(52) U.S. Cl.
CPC ............ *H04W 28/06* (2013.01); *H04L 1/16* (2013.01); *H04L 65/61* (2022.05)

(58) Field of Classification Search
CPC ....... H04W 28/06; H04L 1/16; H04L 65/4069
See application file for complete search history.

(56) References Cited

U.S. PATENT DOCUMENTS

| 7,729,299 B2* | 6/2010 | Eisenberg | .............. | H04Q 11/04 |
| | | | | 370/260 |
| 10,277,716 B2* | 4/2019 | Bhaskar | .................. | H04L 65/65 |
| (Continued) | | | | |

FOREIGN PATENT DOCUMENTS

| JP | 2004048281 | 2/2004 |
| KR | 1020060121938 | 11/2006 |
| (Continued) | | |

OTHER PUBLICATIONS

PCT International Application No. PCT/KR2019/005418, International Search Report dated Dec. 27, 2019, 4 pages.

*Primary Examiner* — Christopher M Crutchfield
*Assistant Examiner* — Tito Q Pham
(74) *Attorney, Agent, or Firm* — Lee, Hong, Degerman, Kang & Waimey PC

(57) ABSTRACT

The disclosure relates to a device for transmitting a data stream and a device for receiving a data stream. Disclosed is a device for transmitting a data stream including: an encoder configured to generate a compressed bitstream by encoding input media, generate additional information about the compressed bitstream, and generate a data stream (DS) including the additional information and the compressed bitstream, wherein the additional information includes at least one class information indicating an importance of the compressed bitstream, and a DS transmitter configured to generate a packet by packing the data stream, transmit a plurality of packets including the generated packet to a (Continued)

reception device, and retransmit at least some of the plurality of packets due to transmission error, wherein the retransmitted packets are identified based on at least corresponding class information.

9 Claims, 13 Drawing Sheets

(56) References Cited

U.S. PATENT DOCUMENTS

| | | | | |
|---|---|---|---|---|
| 2002/0012360 A1* | 1/2002 | Olivieri | ............... | H03M 13/35 370/473 |
| 2003/0009717 A1* | 1/2003 | Fukushima | ........... | H04L 1/1809 714/748 |
| 2004/0008768 A1* | 1/2004 | Banba | ................. | H04L 1/0059 375/240.1 |
| 2004/0042420 A1* | 3/2004 | Agarwal | ........... | H03M 13/6312 370/310.1 |
| 2008/0088743 A1* | 4/2008 | Zhu | ..................... | H04N 19/136 348/578 |
| 2012/0131223 A1* | 5/2012 | Watson | ................... | H04L 69/16 709/235 |
| 2013/0308056 A1* | 11/2013 | Kim | ..................... | H04N 19/67 348/617 |
| 2015/0067758 A1* | 3/2015 | Jeanne | ............... | H04N 21/4122 725/151 |
| 2018/0091634 A1* | 3/2018 | Mobasher | .......... | H04N 21/4122 |
| 2019/0042088 A1* | 2/2019 | Liang | ................... | G06F 3/0655 |
| 2020/0045719 A1* | 2/2020 | Wang | .................. | H04W 72/02 |
| 2021/0306407 A1* | 9/2021 | Uluag | .................. | H04L 65/607 |

FOREIGN PATENT DOCUMENTS

| | | |
|---|---|---|
| KR | 1020070111295 | 11/2007 |
| KR | 1020180035140 | 4/2018 |

* cited by examiner (A)

| P0_L0 | P0_L1 | ... | P0_L0 | P0_L1 | P1_L0 | P1_L1 | ... | P1_L0 | P1_L1 |

FIG. 8

| M Bits BitStream Class | N Bits File Offset | |
|---|---|---|
| 0 | 0 Bytes | → First region |
| 1 | 53 Bytes | → Second region |
| 2 | 278 Bytes | → Third region |
| 3 | 780 Bytes | → Fourth region |

FIG. 9

| Class Info | Actual Data |
|---|---|
| class[1:0] | Bit_Stream 1[127:0] |
| class[1:0] | Bit_Stream 2[127:0] |
| class[1:0] | Bit_Stream 3[127:0] |
| class[1:0] | Bit_Stream 4[127:0] |

FIG. 12

| Occurrence of error | BitStream Class |
|---|---|
| 0 | 0 |
| 0 | 0 |
| 0 | 0 |
| 1 | 1 |
| ⋮ | ⋮ |
| 0 | 3 |

DEVICES AND SYSTEM FOR TRANSMITTING AND RECEIVING COMPRESSED BITSTREAM VIA WIRELESS STREAM AND HANDLING TRANSMISSION ERROR

CROSS-REFERENCE TO RELATED APPLICATIONS

This application is the National Stage filing under 35 U.S.C. 371 of International Application No. PCT/KR2019/005418, filed on May 7, 2019, which claims the benefit of earlier filing date and right of priority to Korean Patent Application No. 10-2019-0037333, filed on Mar. 29, 2019, the contents of which are all incorporated by reference herein in their entirety.

BACKGROUND OF THE DISCLOSURE

Field of the Disclosure

The disclosure relates to transmission and reception of a data stream and, more particularly, to a system, devices, and methods for transmitting and receiving a data stream on the basis of wireless communication.

Related Art

With the appearance of new applications, there are increasing demands for technology for wirelessly transmitting a data stream including an audio, a video, a picture, or at least a combination thereof. A device that wirelessly transmits a data stream is referred to as a wireless stream transmission device, and a device that wirelessly receives a data stream is referred to as a wireless stream reception device. A system that includes a wireless stream transmission device and a wireless stream reception device is referred to as a wireless stream transceiving system.

A wireless stream transceiving system needs to be designed in view of a plurality of characteristics. First, the wireless stream transceiving system is sensitive to time/latency. When there is a high probability that an error occurs in stream transmission depending on ambient conditions, an error may generally be repaired by packet retransmission. However, in applications requiring remarkably low latency, such as augmented reality (AR) or virtual reality (VR) applications, any portion of a frame not received within an inter-frame time may be dropped so that a wireless stream reception device (e.g., a display) can start rendering of the next frame, required for maintaining low latency.

Thus, a wireless stream transceiving system needs to support a high bandwidth due to the emergence of high-quality video formats such as HD, FHD, UHD, or the like. However, wireless stream transceiving systems use a wireless channel and thus may easily encounter interference as compared to a system using a wired channel. Therefore, when the condition of the wireless channel deteriorates, it may be difficult to provide guaranteed quality of service (QoS) for transmitting a high-quality data stream, and a transmission bandwidth may be reduced.

A data stream may include a compressed (or encoded) bitstream. That is, the compressed bitstream may be transmitted or received on the basis of the wireless stream transceiving system. In this case, a wireless stream transmission device may further include an encoder to compress data, and the wireless stream reception device may further include a decoder to reconstruct compressed data. When the probability of a transmission error is increased due to deterioration in a wireless channel during the transmission of the data stream, the decoder may have a serious error in reconstructing the data stream leading to an operation stoppage.

Therefore, when a compressed bitstream is transmitted via the wireless stream transceiving system, a method for guaranteeing a certain level or higher of reconstructed quality in response to an error or loss in transmission is required.

SUMMARY OF THE DISCLOSURE

An aspect of the disclosure is to provide a device and a method for transmitting a wireless stream and a device and a method for receiving a wireless stream that are robust to transmission environment deterioration and capable of providing the characteristic of low-latency.

Another aspect of the disclosure is to provide a device and a method for transmitting a wireless stream and a device and a method for receiving a wireless stream that control a compressed bitstream to be reconstructed at a certain level even in the occurrence of a transmission error.

Still another aspect of the disclosure is to provide a device and a method for encoding a wireless stream and a device and a method for decoding a wireless stream that control a compressed bitstream to be reconstructed at a certain level even in the occurrence of a transmission error.

According to one embodiment of the disclosure, there is provided a device for transmitting a wireless stream. The device includes: an encoder configured to generate a compressed bitstream by encoding input media; generate additional information about the compressed bitstream; and generate a data stream (DS) comprising the additional information and the compressed bitstream, wherein the additional information comprises at least one class information indicating an importance of the compressed bitstream; and a DS transmitter configured to: generate a packet by packing the data stream; transmit a plurality of packets including the generated packet to a reception device; and retransmit at least some of the plurality of packets due to transmission error, wherein the retransmitted packets are identified based on at least corresponding class information.

According to another embodiment of the disclosure, there is provided a device for receiving a wireless stream a data stream (DS) receiver configured to receive a plurality of packets from a transmission device; determine whether to request retransmission of a packet of the plurality of packets based on at least one class information of the packet when the packet is not properly received due to a transmission error; a decoder configured to perform decoding using a previously received packet, a packet previously dropped due to a transmission error, or a packet received following a retransmission request; and output a data stream comprising a compressed bitstream and class information indicating importance of the compressed bitstream obtained by decoding the packet.

It is possible to transmit and decode a compressed stream robust to an error in a low-latency wireless compression transmission system.

BRIEF DESCRIPTION OF THE DRAWINGS

FIG. 7 illustrates a compressed bitstream including a plurality of regions according to another embodiment.

FIG. 8 illustrates additional information according to an embodiment.

FIG. 9 illustrates additional information and a compressed bitstream according to another embodiment.

FIG. 12 illustrates information about whether an error occurs and class information about a bitstream according to an example.

DESCRIPTION OF EXEMPLARY EMBODIMENTS

Figure 1:
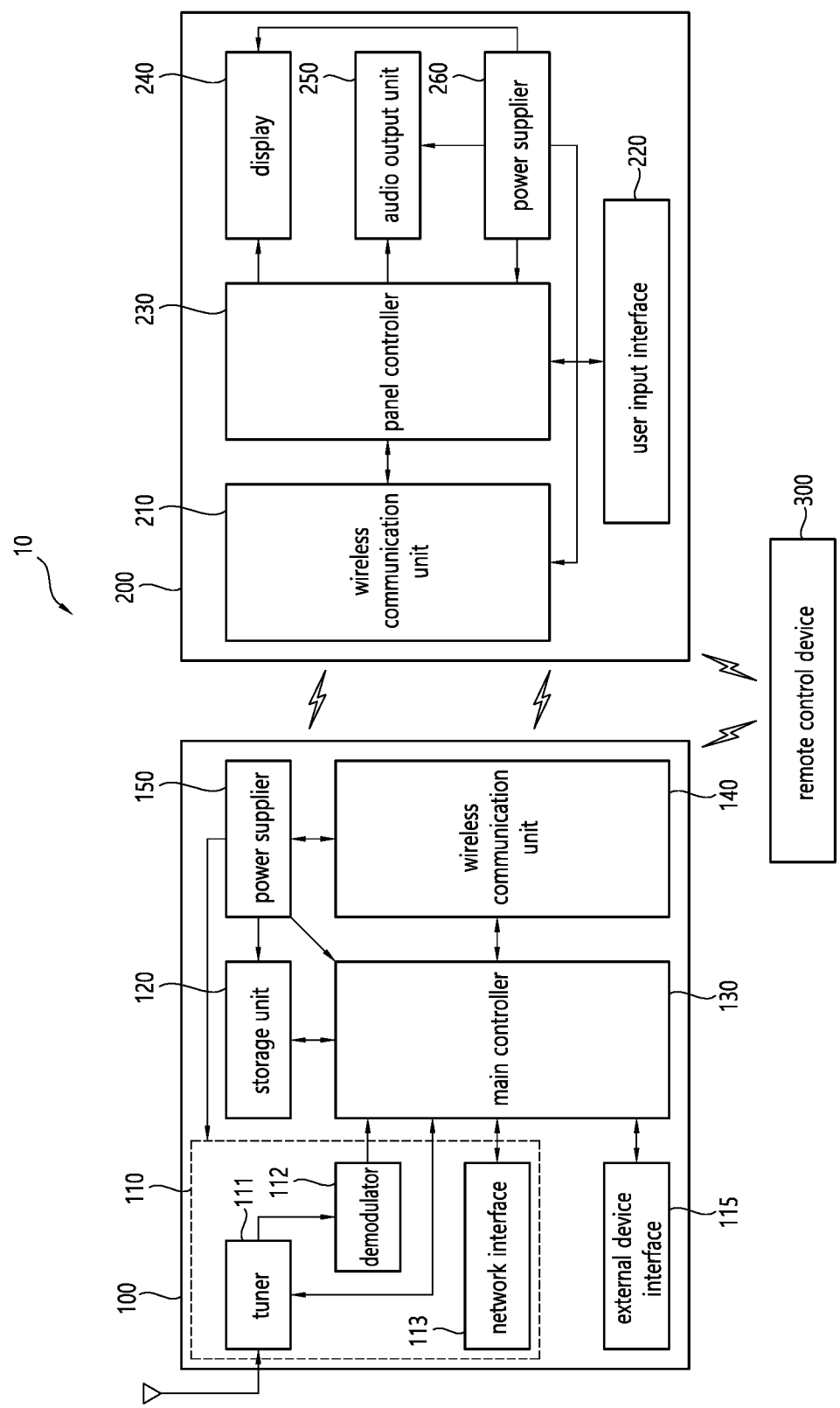
FIG. 1 is a block diagram illustrating a display system according to one embodiment.

The following detailed description illustrates embodiments of a device and a method for transmitting a wireless stream and a device and a method for receiving a wireless stream according to the disclosure and do not represent the only forms of the disclosure. Features of the disclosure are described with reference to illustrated embodiments. However, functions and structures similar or equivalent to those in illustrative embodiments described herein may be include in the idea and scope of the disclosure and may be achieved by other intended embodiments. Throughout this specification, like reference numerals refer to like components or features. Hereinafter, embodiments of the disclosure will be described in detail with reference to the accompanying drawings.

In recent years, the design of a display device, such as a TV, has become important, and display panels have become thinner with the development of technologies for display panels, such as OLED. However, due to the thickness of a driving circuit required to drive a display panel, there have been limits in manufacturing and designing a thinner display panel.

Therefore, technologies for physically and electrically separating components from a display device into a separate device (hereinafter, sometimes referred to as a "main device") are considered. In this case, a main device and a display device may be configured to exchange data, image signals, and audio signals with each other using wireless communication. This disclosure relates to a wireless display system in which a main device and a display device are configured as physically and/or electrically independent components, media is played using wireless communication between the devices.

FIG. 1 is a block diagram illustrating a display system according to an embodiment.

Referring to FIG. 1, the display system 10 may include a main device 100, a display device 200, and a remote control device 300.

The main device 100 may receive an external signal in a wired or wireless form associated with media, such as an audio, a video, a picture, an image, multimedia, or at least one combination thereof. The main device 100 may process the received external signal using various methods to generate a data stream or a bitstream, and may transmit the data stream or the bitstream to the display device 200.

To perform this operation, the main device 100 may include an external signal receiver 110, an external device interface 115, a storage unit 120, a main controller 130, a wireless communication unit 140, and a power supplier 150.

The external signal receiver 110 may include a tuner 111, a demodulator 112, and a network interface 113.

The tuner 111 receives an external signal in a wired or wireless form associated with the media, such as an audio, a video, a picture, an image, multimedia, or at least one combination thereof. For example, the tuner 111 may select a particular broadcast channel according to a channel selection command and may receive a broadcast signal of the selected particular broadcast channel.

The demodulator 112 may separate a received external signal into a video signal, an image signal, a picture signal, an audio signal, and a data signal associated with a broadcast program and may reconstruct the video signal, the image signal, the picture signal, the audio signal, and the data signal associated with the broadcast program into an outputtable form.

The external device interface 115 may receive an application or an application list in an external device and may transmit the application or the application list to the main controller 130 or the storage unit 120.

The external device interface 115 may provide a connection path between the main device 100 and an external device. The external device interface 115 may receive one or more of an audio, a video, a picture, an image, multimedia, and at least one combination thereof output from an external device connected to the main device 100 wirelessly or via a cable and may transmit the same to the main controller 130. The external device interface 115 may include a plurality of external input terminals. The plurality of external input terminals may include an RGB terminal, one or more high definition multimedia interface (HDMI) terminals, and a component terminal.

An external device connectable to the external device interface 115 may be any one of a set-top box, a Blu-ray player, a DVD player, a game console, a soundbar, a smartphone, a PC, a USB memory, and a home theater system, which are provided only for illustration. It will be understood by those of ordinary skill in the art that various types of external devices configured to provide audio, video, or other forms of media to the main device 1000 may be implemented with the disclosure.

The network interface 113 may provide an interface for connecting the main device 100 to a wired or wireless network including an Internet or intranet network. The network interface 113 may transmit or receive data to or from a different user or a different electronic device through a connected network or a different network linked to the connected network.

Further, the network interface 113 may transmit some content data, stored in the main device 100, to a user selected from among different users registered in advance in the main device or to an electronic device selected from among different electronic devices registered in advance in the main device 100.

The network interface 113 may access a predetermined web page through a connected network or a different network linked to the connected network. That is, the network interface 113 may access the predetermined web page through the network, thereby transmitting or receiving data to or from a server.

In addition, the network interface 113 may receive content or pieces of data provided by a content provider or a network operator. That is, the network interface 113 may receive content, such as a movie, an advertisement, a game, a VOD, or a broadcast signal, and information related therewith, which are provided from the content provider or the network provider through a network.

The network interface 113 may receive update information and an update file of firmware provided by the network operator and may transmit pieces of data to the Internet, a content provider, or the network operator.

The network interface 113 may select and receive a desired application among applications open to the public through a network.

The storage unit 120 may store a program for processing and controlling each signal in the main controller 130 and may store an image, a sound, or a data signal resulting from signal processing.

The storage unit 120 may perform a function of temporarily storing an image, a sound, or a data signal input from the external device interface 115 or the network interface 113 and may store information about an image through a channel memory function.

The storage unit 120 may store an application or an application list input from the external device interface 115 or the network interface 113.

The main controller 130 may control the main device 100 by a user command input through the remote control device 300 or an internal program and may access a network to download an application or an application list desired by a user to the main device 100.

The main controller 130 may output user-selected channel information along with a processed image or audio signal through a display device 200 or an audio output unit 250.

The main controller 130 may output an image signal or an audio signal, which is input from an external device, for example, a camera or a camcorder, via the external device interface 115, through the display device 200 or an audio output unit 250 according to an external device image playback command received through the remote control device 300

The main controller 130 may control content stored in the storage unit 120, received broadcast content, or externally input content to be played back, and these pieces of content may take various forms, such as a broadcast image, an externally input image, an audio file, a still image, a connected web screen, or a document file, for example.

The main controller 130 may decode a video, an image, a picture, a sound, or data related to a broadcast program input through the demodulator 112, the external device interface 115, or the storage unit 120, may process the decoded data using various video/audio processing techniques, such as compression and encoding, to transmit the data via a wireless channel to thereby generate a data stream or bitstream, and may transmit the generated data stream or bitstream to the display device 200 through the wireless communication unit 140.

The main controller 130 may be configured to implement the functions, procedures, and/or methods of a processor 1130 of a wireless stream transmission device 1100 to be described with reference to each embodiment of this specification. Wireless interface protocol layers may be implemented in the processor 1130.

The wireless communication unit 140 is operatively coupled to the main controller 130 to receive a data stream or bitstream from the main controller 130, generate a wireless stream by encoding and/or modulating the data stream or bitstream into a form for transmission via a wireless channel, and transmit the wireless stream to the display device 200. The wireless communication unit 140 establishes a wireless link, and the main device 100 and the display device 200 are connected via the wireless link. The wireless communication unit 140 may be configured on the basis of various wireless communication modes, such as short-range wireless communication including Wi-Fi, Bluetooth, NFC, and RFID, or a mobile communication network (e.g., 3G, 4G, and 5G cellular networks). For example, the wireless communication unit 140 may perform communication using a communication protocol, such as IEEE 802.11 series of standards.

The power supplier 150 supplies power to various components of the main device 100 including the external signal receiver 110, the external device interface 115, the storage unit 120, the main controller 130, and the wireless communication unit 140. Methods for the power supplier 150 to receive power from the outside may include a terminal method and a wireless method. When the power supplier 150 receives power using a wireless method, the power supplier 150 may include a separate configuration to wirelessly receive power. For example, the power supplier 150 may include a power pickup unit configured to be magnetically coupled with an external wireless power transmission device to receive wireless power and a separate communication and control unit configured to perform communication with the wireless power transmission device in order to receive wireless power and to control transmission and reception of wireless power.

The wireless communication unit 140 may also be wirelessly connected to the remote control device 300 to transmit a signal input by a user to the main controller 130 or to transmit a signal from the main controller 130 to the user. For example, the wireless communication unit 140 may receive and process control signals to power on/off the main device 100 or to set a screen from the remote control device 300 or may process a control signal from the main controller 130 to be transmitted to the remote control device 300 according to various communication modes, such as Bluetooth, ultra-wideband (WB), ZigBee, radio frequency (RF), and infrared (IR) communication modes.

The wireless communication unit 140 may also transmit a control signal, input via a local key (not shown), such as a power key, a volume key, and a setup key, to the main controller 130.

The display device 200 may process a wireless stream, received from the main device 100 through a wireless interface, according to the reverse process of signal processing by the main device 100 and may output a display or a sound. To this end, the display device 200 may include a wireless communication unit 210, a user input interface 220, a panel controller 230, a display 240, an audio output unit 250, and a power supplier 260.

The wireless communication unit 210 is connected to the wireless communication unit 140 of the main device 100 via a wireless link and performs wireless communication with the wireless communication unit 140 of the main device 100. Specifically, the wireless communication unit 210 receives a wireless stream from the wireless communication unit 140 of the main device 100, demodulates the wireless stream, and transmits the wireless stream to the panel controller 230. The wireless communication unit 210 may be configured on the basis of various wireless communication modes, such as short-range wireless communication including Wi-Fi, Bluetooth, NFC, and RFID, or a mobile communication network (e.g., 3G, 4G, and 5G cellular networks). For example, the wireless communication unit 210 may perform communication using a communication protocol, such as IEEE 802.11 series of standards.

The panel controller 230 decodes a signal demodulated by the wireless communication unit 210 to reconstruct a bitstream or a data stream. In this case, when the bitstream or the data stream is compressed, the panel controller 230 may decompress or reconstruct the bitstream or the data stream, may output the bitstream or the data stream as a video signal, an image signal, a picture signal, an audio signal, or a data signal associated with a broadcast program, and may transmit the signals to the display 240, the audio output unit 250, and the user input interface 220.

The video signal, the picture signal, or the image signal may be input to the display 240 and may be displayed as an image corresponding to a corresponding picture signal. In addition, the picture signal processed by the panel controller 230 may be transmitted back to the main device 100 through the wireless communication unit 210 and may then be input to an external output device through the external device interface 115 of the main device 100.

The audio signal processed by the panel controller 230 may be audio-output to the audio output unit 250. Further, the audio signal processed by the panel controller 230 may be transmitted back to the main device 100 through the wireless communication unit 210 and may then be input to an external output device through the external device interface 115 of the main device 100.

The panel controller 230 may control the display 240 to display an image. For example, the panel controller 230 may control the display 250 to display a broadcast image input through the tuner 111, an externally input image input through the external device interface 115, an image input through the network interface unit, or an image stored in the storage unit 120. In this case, an image displayed on the display 240 may be a still image or a video, and may be a 2D image or a 3D image.

The panel controller 230 may be configured to implement the functions, procedures, and/or methods of a processor 1230 of a wireless stream reception device 1200 to be described with reference to each embodiment of this specification. The processor 1230 may be configured to implement the functions, procedures, and/or methods of the wireless stream reception device 1200 to be described with reference to each embodiment of this specification.

The user input interface 220 may transmit a signal input by the user to the panel controller 230 or may transmit a signal from the panel controller 230 to the user. For example, the user input interface 220 may receive and process control signals to power on/off the display device 200 or to set a screen from the remote control device 300 or may process a control signal from the panel controller 230 to be transmitted to the remote control device 300 according to various communication modes, such as Bluetooth, WB, ZigBee, RF, and IR communication modes.

The user input interface unit 220 may transmit a control signal, input via a local key (not shown), such as a power key, a volume key, and a setup key, to the panel controller 230.

The power supplier 260 supplies power to various components of the display device 200 including the wireless communication unit 210, the user input interface 220, the panel controller 230, the display 240, and the audio output unit 250. Methods for the power supplier 260 to receive power from the outside may include a terminal method and a wireless method. When the power supplier 260 receives power using a wireless method, the power supplier 260 may include a separate configuration to wirelessly receive power. For example, the power supplier 260 may include a power pickup unit configured to be magnetically coupled with an external wireless power transmission device to receive wireless power and a separate communication and control unit configured to perform communication with the wireless power transmission device in order to receive wireless power and to control transmission and reception of wireless power.

The remote control device 300 performs an operation of remotely controlling various features of the main device 100 or the display device 200 including power on/off, channel selection, screen setup, adjusting settings, or the like.

Since the main device 100 and the display device 200 illustrated in FIG. 1 are provided only as an example of one embodiment of the disclosure, some of the illustrated components may be integrated or omitted, or other components may be added according to the specifications of the main device 100 and the display device 200 to be actually implemented. That is, as necessary, two or more components may be integrated into one component, or one component may be divided into two or more components. In addition, a function performed in each block is illustrated for explaining an embodiment of the disclosure, and a specific operation or device does not limit the scope of the disclosure.

According to another embodiment of the disclosure, the main device 100 may receive and play back an image through the network interface 113 or the external device interface 115 without including the tuner 111 and the demodulator 112.

For example, the main device 100 may be divided into an image processing device, such as a set-top box for receiving a broadcast signal or content according to various network services, and a content playback device for playing content input from the image processing device.

In this case, an operating method of the display system 10 according to an embodiment of the disclosure to be described below may be performed not only by the main device 100 and the display device 200 described with reference to FIG. 1 but also by either the divided image processing device, such as the set-top box, or the content playback device including an audio output unit 250.

From the perspective of system input/output, the main device 100 may be referred to as a wireless source device that wirelessly provides a source, and the display device 200 may be referred to as a wireless sink device that wirelessly receives a source. The wireless source devices and the wireless sink devices may implement wireless display (WD) communication technologies that are compatible with standards such as wireless HD, wireless home digital interface (WHDI), WiGig, wireless USB, and Wi-Fi display (WFD, also known as Miracast).

From the perspective of applications, the main device 100 may be integrated as a form that is included as a part in a wireless set-top box, a wireless gaming console, a wireless digital video disc (DVD) player, a wireless router, or the like. In this case, the main device 100 may be provided as a wireless communication module or a chip. The display device 200 may be integrated as a form that is included as a part in a user device or electronic device having a display panel to display an image and a video (e.g., a wireless TV, a wireless monitor, a wireless projector, a wireless printer, a wireless vehicle dashboard display, a wearable device, an augmented-reality (AR) headset, a virtual-reality (VR) headset, or the like). In this case, the display device 200 may be provided as a wireless communication module or a chip.

The main device 100 and the display device 200 may be integrated as forms that are included as parts in a mobile device. For example, the main device 100 and the display device 200 may be integrated into a mobile terminal including a smartphone, a smartpad, a tablet PC, or other types of wireless communication devices, a portable computer having a wireless communication card, a personal digital assistant (PDA), a portable media player, a digital image capturing device including a camera or a camcorder, or other flash memory devices having wireless communication capabilities. In this case, the main device 100 and the display device 200 may be provided as wireless communication modules or chips.

Smartphone users can stream or mirror a video and an audio, which is output by the users' smartphone, tablet PC, or other computing devices, to or in another device, such as a television or a projector, in order to provide a higher resolution display or other enhanced user experience.

As described above, the main device 100 may receive an external signal in a wired or wireless form associated with an media including audio, a video, a picture, an image, multimedia, or at least one combination thereof, and the main device 100 may process the received external signal by various methods to generate a data stream or a bitstream, and transmit the data stream or the bitstream to the display device 200 through a wireless interface.

Hereinafter, a data stream or a bitstream transmitted through a wireless interface is referred to as a wireless stream. That is, the main device 100 may wirelessly communicate with the display device 200 and may transmit a wireless stream. Therefore, from the perspective of a wireless stream transceiving system 1000, the main device 100 may be referred to as a wireless stream transmission device 1100, and the display device 200 may be referred to as a wireless stream reception device 1200. Hereinafter, the disclosure will be described in more detail from the perspective of the wireless stream transceiving system 1000. First, a detailed block diagram of the wireless stream transceiving system 1000 will be illustrated.

Figure 2:
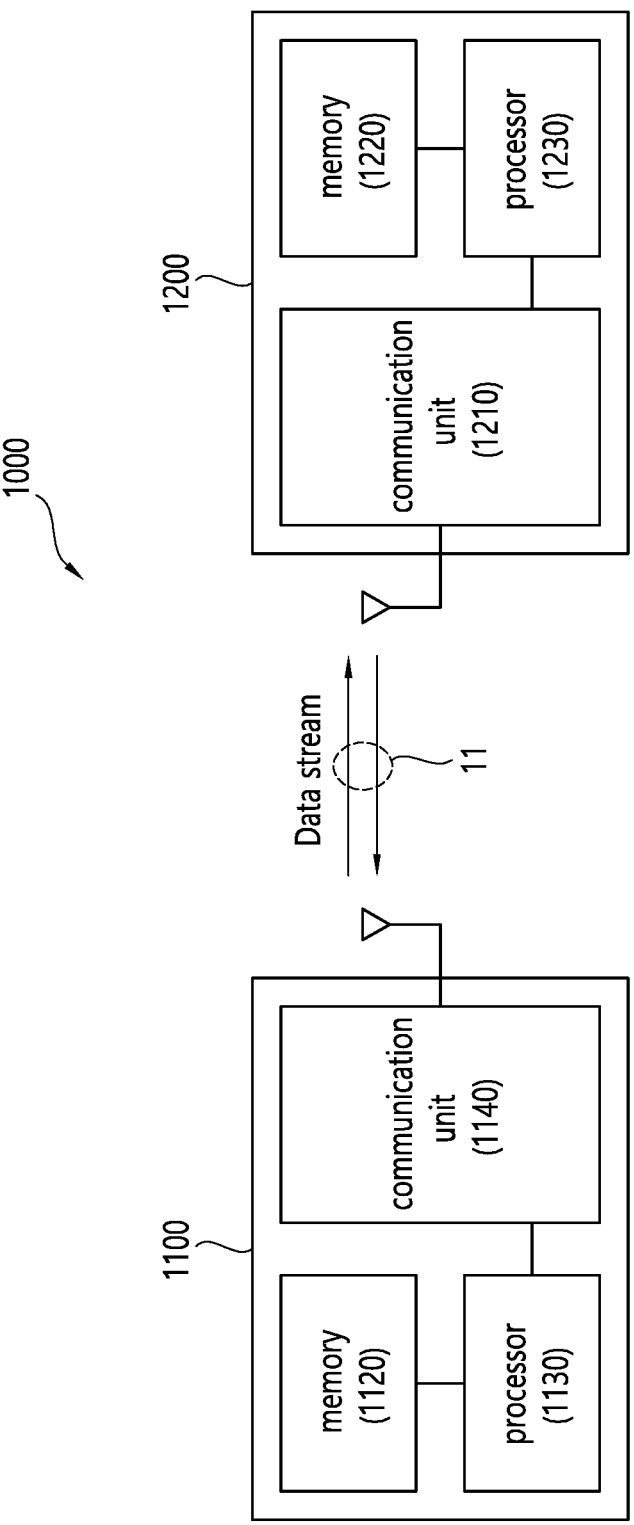
FIG. 2 is a block diagram illustrating a wireless stream transceiving system according to an embodiment.

FIG. 2 is a block diagram illustrating a wireless stream transceiving system according to an embodiment.

Referring to FIG. 2, a wireless stream transceiving system 1000 refers to a system that wirelessly transmits and receives a data stream and includes a wireless stream transmission device 1100 and at least one wireless stream reception device 1200. The wireless stream transmission device 1100 is communicatively coupled to the at least one wireless stream reception device 1200.

According to one aspect, the data stream may include an audio, a video, a picture, an image, multimedia, or at least one combination thereof.

According to another aspect, the data stream may include a bitstream in the form of a compressed audio, a bitstream in the form of a compressed video, a bitstream in the form of a compressed picture, a bitstream in the form of compressed multimedia, or at least one combination thereof. In this case, the wireless stream transceiving system 1000 may be referred to as a wireless compressed data stream transceiving system. In addition, the wireless compressed data stream transceiving system 1000 may further include a functional or physical unit for compressing data.

Regarding the detailed configuration of each device, the wireless stream transmission device 1100 includes a processor 1130, a memory 1120, and a communication unit 1140, and the wireless stream reception device 1200 includes a communication unit 1210, a memory 1220, and a processor 1230.

The processor 1130 may be configured to implement the functions, procedures, and/or methods of the wireless stream transmission device 1100 to be described with reference to each embodiment of this specification. The processor 1230 may also be configured to implement the functions, procedures, and/or methods of the wireless stream reception device 1200 to be described with reference to each embodiment of this specification. Wireless interface protocol layers may be implemented in the processors 1130 and 1230.

From the perspective of the display system in FIG. 1, the processor 1130 may be configured to perform the function of the main controller 130. For example, the processor 1130 may decode a video, an image, a picture, a sound, or data related to a broadcast program input through the demodulator 112, the external device interface 115, or the storage unit 120, may process the decoded data using various video/audio processing techniques, such as compression and encoding, to transmit the data via a wireless channel to thereby generate a data stream or bitstream, and may transmit the generated data stream or bitstream to the display device 200 through the wireless communication unit 140.

The memories 1120 and 1220 are operatively coupled with the processors 1130 and 1230 and store various pieces of information for operating the processors 1130 and 1230.

The communication units 1140 and 1210 are operatively coupled with the processors 1130 and 1230 and wirelessly transmit and/or receive a data stream. The communication units 1140 and 1210 establish a wireless link 11, and the wireless stream transmission device 1100 and the wireless stream reception device 1200 are connected via the wireless link 11. The communication units 1140 and 1210 may be configured on the basis of various wireless communication modes, such as short-range wireless communication including Wi-Fi, Bluetooth, NFC, and RFID, or a mobile communication network (e.g., 3G, 4G, and 5G cellular networks). For example, the wireless communication units 1140 and 1210 may perform communication using a communication protocol, such as IEEE 802.11 series of standards.

Figure 3:
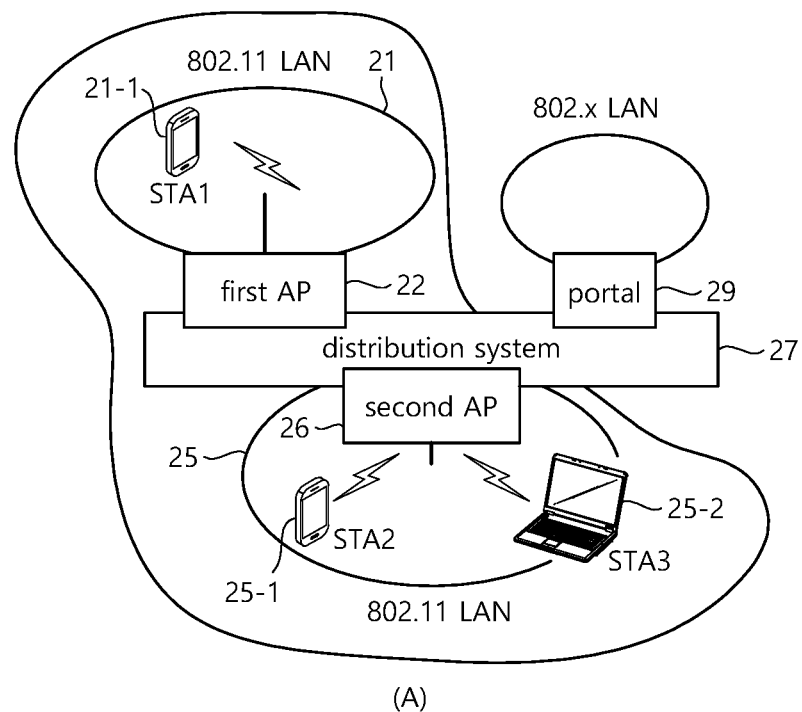
FIG. 3 is a conceptual diagram illustrating the case where a wireless stream transceiving system is implemented with a communication protocol of IEEE 802.11 series of standards according to an embodiment.
Figure 3:
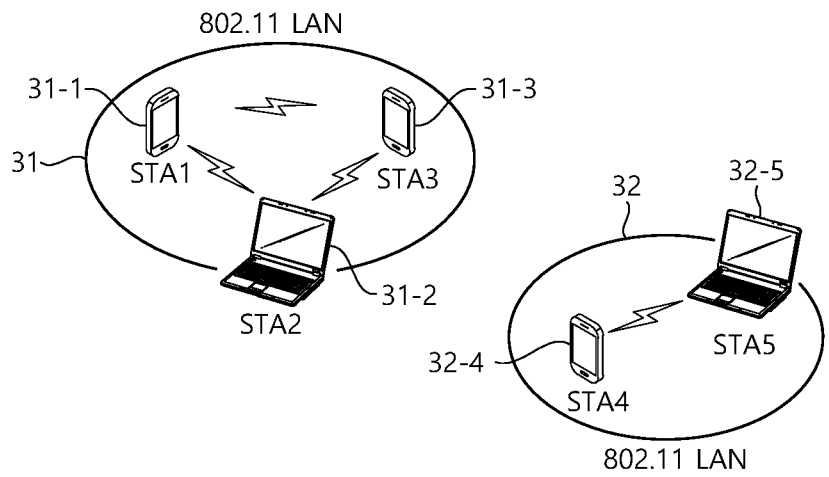

FIG. 3 is a conceptual diagram illustrating the case where a wireless stream transceiving system is implemented with a communication protocol of IEEE 802.11 series of standards according to an embodiment.

Referring to FIG. 3, a wireless stream transceiving system 20 in (A) of FIG. 3 may include at least one basic service set (hereinafter, "BSS") 21 and 25. A BSS is a set of an access point (hereinafter, "AP") and a station (STA) that are successfully synchronized and can thus communicate with each other and does not refer to a particular area.

For example, a first BSS 21 may include a first AP 22 and one first STA 21-1. A second BSS 25 may include a second AP 26 and one or more STAs 25-1 and 25-2. Here, the first AP 22 may correspond to the communication unit 1140 of FIG. 2, and the one or more STAs 25-1 and 25-2 may correspond to the communication unit 1210 of FIG. 2.

An infrastructure BSS 21 and 25 may include at least one STA, an AP 22 and 26 providing a distribution service, and a distribution system 27 connecting a plurality of APs.

The distribution system 27 may connect the plurality of BSSs 22 and 26 to configure an extended service set (hereinafter, "ESS") 28 which is an extended set of services. The ESS 28 may be used as a term indicating one network in which at least one AP 22 and 26 is connected through the distributed system 27. At least one AP included in one ESS 28 may have the same service set identification (hereinafter, "SSID").

A portal 29 may serve as a bridge connecting a WLAN network (IEEE 802.11) with another network (e.g., 802.X).

In a WLAN having the structure illustrated in (A) of FIG. 3, a network between the APs 22 and 26 and a network between the APs 22 and 26 and the STAs 21-1, 25-1, and 25-2 may be configured.

A wireless stream transceiving system 30 in (B) of FIG. 3 may be capable of performing communication by establishing a network between STAs without APs 22 and 26 unlike that in (A) of FIG. 3. A network established between STAs without APs 22 and 26 to perform communication is defined as an ad-hoc network or an independent basic service set (hereinafter, "MSS").

Referring to (B) of FIG. 3, the wireless stream transceiving system 30 is a BSS operating in an ad-hoc mode, that is, an IBSS. An IBSS does not include an AP and thus has no centralized management entity. Therefore, in the wireless stream transceiving system 30, STAs 31-1, 31-2, 31-3, 32-4, and 32-5 are managed in a distributed manner. Here, the STAs 31-1, 31-2, 31-3, 32-4, and 32-5 may correspond to the communication unit 1140 or the communication unit 1210 of FIG. 2.

All the STAs 31-1, 31-2, 31-3, 32-4, and 32-5 of the IBSS may be mobile STAs and are not allowed to access a distributed system. All the STAs of the IBSS establish a self-contained network.

An STA mentioned herein is any functional medium including a medium access control (MAC) and a physical layer interface for a wireless medium according to the Institute of Electrical and Electronics Engineers (IEEE) 802.11 standard and may be used to broadly refer to both an AP and a non-AP STA.

An STA mentioned herein may be referred to as various terms, such a mobile terminal, a wireless device, a wireless transmit/receive unit (WTRU), user equipment (UE), a mobile station (MS), a mobile subscriber unit, and simply a user.

Figure 4:
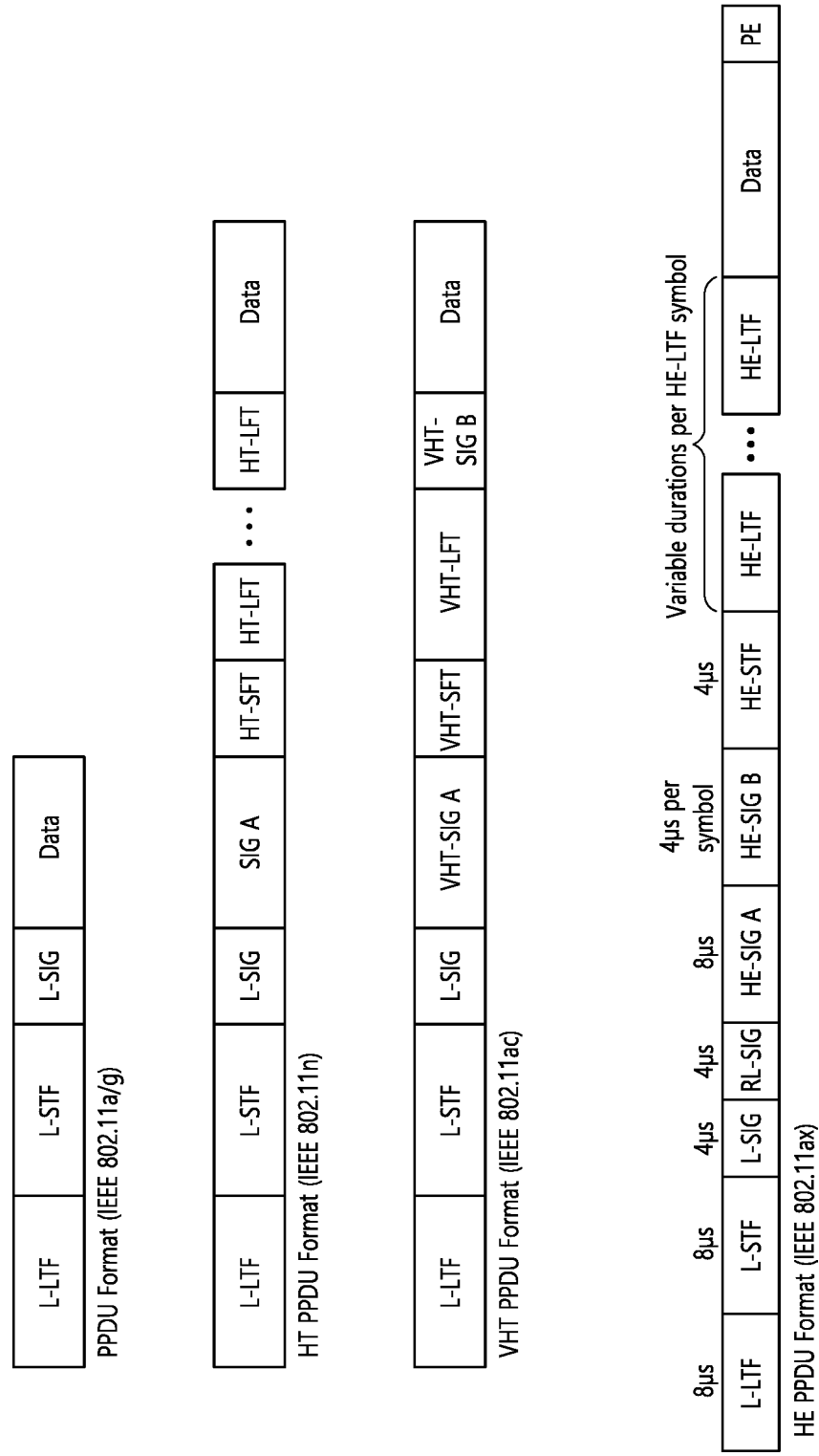
FIG. 4 illustrates a physical layer convergence procedure (PLCP) protocol data unit (PPDU) format used in an IEEE standard according to an example.

FIG. 4 illustrates a PPDU format used in an IEEE standard according to an example.

Referring to FIG. 4, various types of PHY protocol data units (PPDUs) are used in the IEEE a/g/n/ac standards. Specifically, an LTF and an STF include a training signal, a SIG-A and a SIG-B include control information for a receiving station, and a data field includes user data corresponding to a PSDU.

A data stream or information about the data stream according to this specification may be applied to a high-efficiency PPDU (HE PPDU) according to the IEEE 802.11ax standard. That is, the data stream or the information about the data stream according to this specification may be included in an HE-SIG-A and/or an HE-SIG-B included in the HE PPDU. The HE-SIG-A and the HE-SIG-B may also be represented as an SIG-A and an SIG-B, respectively. However, the data stream or the information about the data stream according to this specification is not limited as being necessarily applied only to the HE-SIG-A and/or the HE-SIG-B standard but may be applicable to a control/data field with various terms including control information in a wireless communication system transmitting user data.

The HE PPDU of FIG. 4 is an example of a PPDU for multiple users. The HE-SIG-B may be included only for multiple users and may be omitted in a PPDU for a single user.

As illustrated, the HE-PPDU for multiple users (MU) may include a legacy-short training field (L-STF), a legacy-long training field (L-LTF), a legacy-signal (L-SIG), a high efficiency-signal-A (HE-SIG-A), a high efficiency-signal-B (HE-SIG-B), a high efficiency-short training field (HE-STF), a high efficiency-long training field (HE-LTF), a data field (or MAC payload), and a packet extension (PE) field. Each field may be transmitted for an illustrated time period (i.e., 4 or 8 μs).

A PPDU used in an IEEE standard is described as a PPDU transmitted generally over a channel bandwidth of 20 MHz. A PPDU transmitted over a wider bandwidth (e.g., 40 MHz or 80 MHz) than the 20-MHz channel bandwidth may have a structure in which linear scaling is applied to a PPDU structure used in the 20-MHz channel bandwidth.

The PPDU used in the IEEE standard may be generated on the basis of 64-point fast Fourier transform (FTF) and may have a cyclic prefix (CP) portion occupying ¼ thereof. In this case, the length of a valid symbol period (or FFT period) may be 3.2 us, the length of the CP is 0.8 us, and symbol duration may be the length of the valid symbol period plus the length of the CP, which is 4 us (3.2 us+0.8 us).

Referring back to FIG. 2, a communication channel established by the communication units 1140 and 1210 may be a network communication channel. In this case, the communication units 1140 and 1210 may establish tunneled direct link setup (TDLS) to avoid or reduce network congestion. Wi-Fi Direct and TDLS are for setting up relatively short-range communication sessions. The communication channel forming a wireless link 11 may be a communication channel of a relatively short range or a communication channel configured using a physical channel structure, such as Wi-Fi using a variety of frequencies including 2.4 GHz, 3.6 GHz, 5 GHz, 60 GHz, or ultra-wideband (UWB) or Bluetooth.

While techniques disclosed herein may generally be described in connection with communication protocols, such as IEEE 802.11 series of standards, aspects of these techniques may also be compatible with other communication protocols. Illustratively and non-restrictively, wireless communication between the communication units 1140 and 1210 may use orthogonal frequency-division multiplexing (OFDM) techniques. Various other wireless communication techniques including, but not limited to, time-division multiple access (TDMA), frequency-division multiple access (FDMA), code-division multiple access (CDMA), or any combination of OFDM, FDMA, TDMA, and/or CDMA may also be used.

The processors 1130 and 1230 may include an application-specific integrated circuit (ASIC), a different chipset, a logic circuit, and/or a data processor. The memories 1120 and 1220 may include a read-only memory (ROM), a random access memory (RAM), a flash memory, a memory card, a storage medium, and/or another storage device. The communication units 1140 and 1210 may include a baseband circuit for processing a radio frequency signal. When an embodiment is implemented with software, the techniques described herein may be implemented with a module (e.g., a process or function) that performs the functions described herein. The module may be stored in the memories 1120 and 1220 and may be executed by the processors 1130 and 1230. The memories 1120 and 1220 may exist outside the processors 1130 and 1230 and may be connected to the processors 1130 and 1230 via various well-known devices.

From the perspective of input/output of a data stream, the wireless stream transmission device 1100 may be referred to as a wireless source device that wirelessly provides a source, and the wireless stream reception device 1200 may be referred to as a wireless sink device that wirelessly receives a source. The wireless source devices and the wireless sink devices may implement wireless display (WD) communication technologies that are compatible with standards such as wireless HD, wireless home digital interface (WHDI), WiGig, wireless USB, and Wi-Fi display (WFD, also known as MIRACAST).

From the perspective of applications, the wireless stream transmission device 1100 may be integrated as a form that is included as a part in a wireless set-top box, a wireless gaming console, a wireless digital video disc (DVD) player, or a wireless router. In this case, the wireless stream transmission device 1100 may be provided as a wireless communication module or a chip. The wireless stream reception device 1200 may be integrated as a form that is included as a part in a user device or electronic device having a display panel to display an image and a video (e.g., a wireless TV, a wireless monitor, a wireless projector, a wireless printer, a wireless vehicle dashboard display, a wearable device, an augmented-reality (AR) headset, or a virtual-reality (VR) headset). In this case, the wireless stream reception device 1200 may be provided as a wireless communication module or a chip.

The wireless stream transmission device 1100 and the wireless stream reception device 1200 may be integrated as forms that are included as parts in a mobile device. For example, the wireless stream transmission device 1100 and the wireless stream reception device 1200 may be integrated into a mobile terminal including a smartphone, a smartpad, a tablet PC, or other types of wireless communication devices, a portable computer having a wireless communication card, a personal digital assistant (PDA), a portable media player, a digital image capturing device including a camera or a camcorder, or other flash memory devices having wireless communication capabilities. In this case, the wireless stream transmission device 1100 and the wireless stream reception device 1200 may be provided as wireless communication modules or chips.

Smartphone users can stream or mirror a video and an audio, which is output by the users' smartphone, tablet PC, or other computing devices, to or in another device, such as a television or a projector, in order to provide a larger or higher resolution display or other enhanced user experience.

Hereinafter, a low-latency wireless compression data stream transmission system that is robust to an error will be described in detail.

Figure 5:
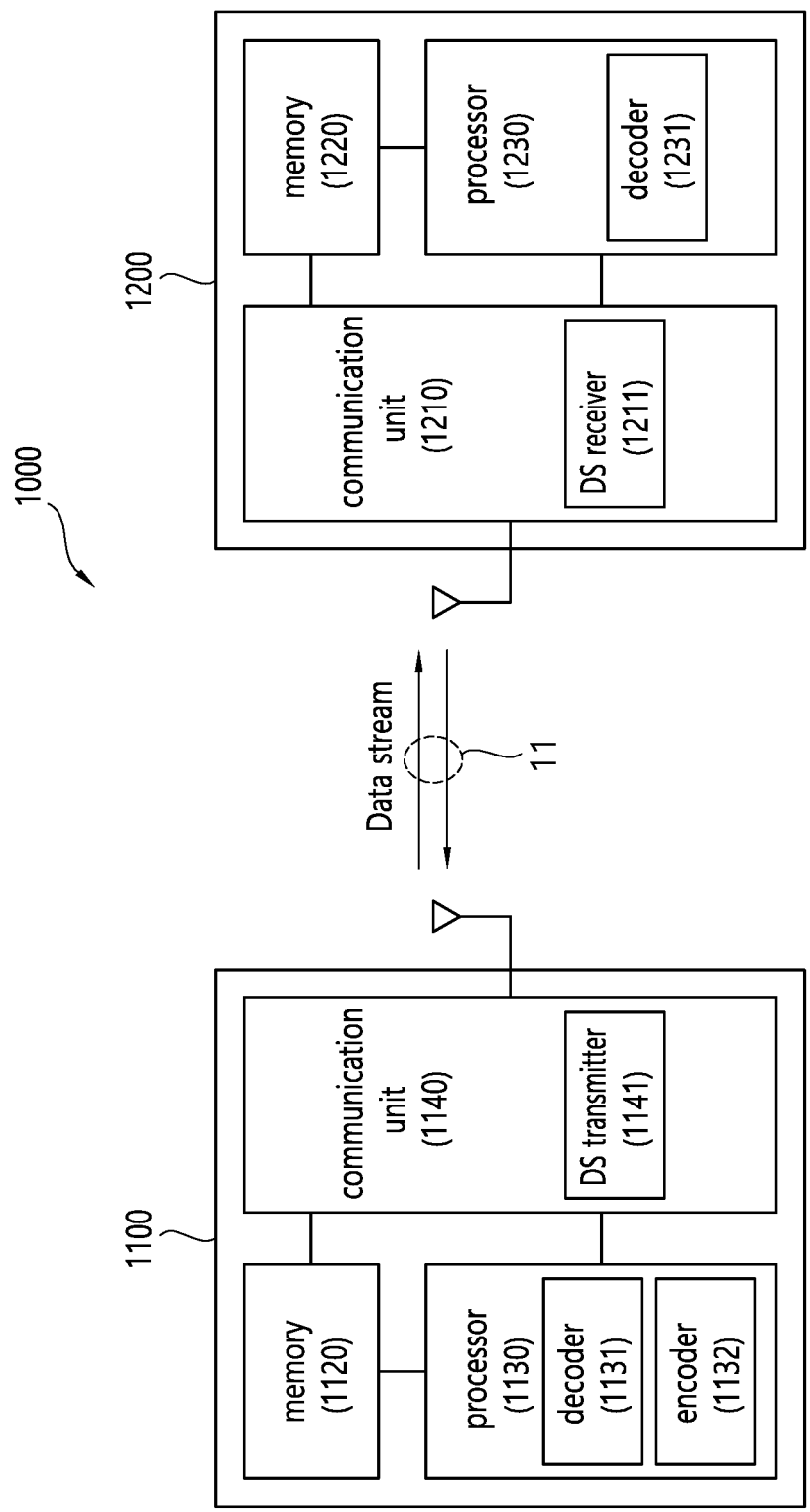
FIG. 5 is a block diagram illustrating a wireless stream transceiving system according to another embodiment.

FIG. 5 is a block diagram illustrating a wireless stream transceiving system according to another embodiment. FIG. 5 illustrates each component of the wireless stream transceiving system 1000 of FIG. 2 in detail.

Referring to FIG. 5, the processor 1130 of the wireless stream transmission device 1100 includes a decoder 1131 and an encoder 1132, and the communication unit 1140 of the wireless stream transmission device 1100 includes a data stream (DS) transmitter 1141. Although the decoder 1131 and the encoder 1132 are illustrated as constituent elements of the structure of the processor 1130, the decoder 1131 and the encoder 1132 may be elements of a function performed by the processor 1130. That is, the encoder 1132 may exist as a function, such as a compression or encoding program or a compression or encoding algorithm, performed by the processor 1130. Likewise, although the DS transmitter 1141 is illustrated as a constituent element of the structure of the communication unit 1140, the DS transmitter 1141 may be a physical layer or an MAC layer of wireless interface layers included in the communication unit 1140 or may be an element of a function performed by the physical layer or the MAC layer. That is, the DS transmitter 1141 may exist as a function of generating and transmitting DS information performed by the physical layer or the MAC layer.

The processor 1230 of the wireless stream reception device 1200 includes a decoder 1231, and the communication unit 1210 of the wireless stream reception device 1200 includes a DS receiver 1211. Although the decoder 1231 is illustrated as a constituent element of the structure of the processor 1230, the decoder 1231 may be an element of a function performed by the processor 1230. That is, the decoder 1231 may exist as a function, such as a reconstruction or decoding program or a reconstruction or decoding algorithm, performed by the processor 1230. Likewise, although the DS receiver 1211 is illustrated as a constituent element of the structure of the communication unit 1210, the DS receiver 1211 may be a physical layer or an MAC layer of wireless interface layers included in the communication unit 1140 or may be an element of a function performed by the physical layer or the MAC layer. That is, the DS receiver 1211 may exist as a function of receiving and demodulating DS information performed by the physical layer or the MAC layer.

Hereinafter, the functions, operations, procedures, and characteristics of the respective components will be described in more detail.

From the perspective of the display system of FIG. 1, the decoder 1131 of the wireless stream transmission device 1100 may decode a video, an image, a picture, a sound, or data related to a broadcast program input through the demodulator 112, the external device interface 115, or the storage unit 120 and may transmit the decoded video, image, picture, sound, or data related to a broadcast program to the encoder 1132 in the processor 1130.

The encoder 1132 compresses or encodes media (an audio, a video, an image, a picture, or at least one combination thereof) input from the decoder 1131, outputs a compressed bitstream, and inputs the compressed bitstream to the DS transmitter 1141.

The encoder 1132 compresses or encodes the input media in various formats.

For example, when the input media is an image, the output compressed bitstream may be a bitstream compressed in a JPEG-XS format. In this case, the encoder 1132 may be a JPEG-XS codec. The JPEG-XS codec is a codec defined in the ISO/IEC 21122 standard for low-latency and low-power image compression formats optimized for real-time streaming. Various image compression/encoding schemes in addition to the JPEG-XS format may also be used for compressing or encoding the image according to this example, and this embodiment includes bitstreams generated by such various embodiments.

In another example, when the input media is a picture or video, the output compressed bitstream may be a data stream in the JPEG-XS format or an HEVC (or H.265) format. Various picture/video compression or encoding schemes including the JPEG-XS format or HEVC (or H.265) format may be used for compressing or encoding the picture or video according to this example, and this embodiment includes bitstreams generated by such various embodiments.

The encoder 1132 may divide the compressed bitstream into a plurality of regions having the same or similar characteristics (or features).

Figure 6:
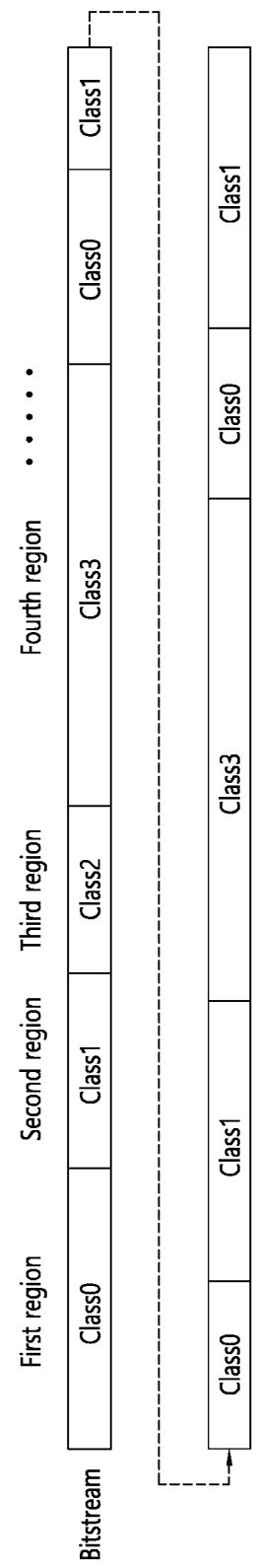
FIG. 6 illustrates a compressed bitstream including a plurality of regions according to an embodiment.

FIG. 6 illustrates a compressed bitstream including a plurality of regions according to an embodiment.

Referring to FIG. 6, the compressed bitstream may include a plurality of regions (first region, second region, third region, fourth region, and the like), and bitstreams in the respective regions may share the same or similar characteristics with each other.

In one aspect, defining the same or similar characteristics in terms of the operation of the decoder 1231, the regions may be divided into various different regions including, for example, a region stopping the operation of the decoder 1231 in the occurrence of an error, a region that can be reconstructed using previously decoded information stored in the decoder 1231 in the occurrence of an error, a region causing a serious problem to the quality of a reconstructed picture in the occurrence of an error, a region not causing a serious problem to the quality of a reconstructed picture in the occurrence of an error, and the like.

In another aspect, defining the same or similar characteristics in terms of the content of the compressed bitstream, the regions may be divided, for example, into a region including a bitstream of an image and a region including a bitstream of information for controlling the reconstruction of the image. For example, when the compressed bitstream includes two regions, a first region may include a compressed bitstream about an image, and a second region may include a bitstream about information for controlling the reconstruction of the image.

In still another aspect, the regions of the compressed bitstream may be divided according to positions in the compressed bitstream.

Each region may have different importance in the event of a transmission error or reconstruction. In this embodiment, the importance of each region is defined as a class. That is, the class is an indicator showing the importance of each region and may be expressed as an index, such as 0, 1, 2, 3, ..., and N. For example, a region having higher importance has a lower class index (e.g., 0), and a region having lower importance has a greater class index (e.g., N). The class index according to the importance may be set in the opposite manner. Importance may indicate a priority in transmission or reconstruction, and a class may be referred to as a category.

Referring to FIG. 6, when the compressed bitstream is divided into the plurality of regions on the basis of the class, classes may be cyclically or repeatedly generated in the bitstream in a pattern, for example, class 0, class 1, class 2, class 3, class 0, class 1, and the like.

Figure 7:
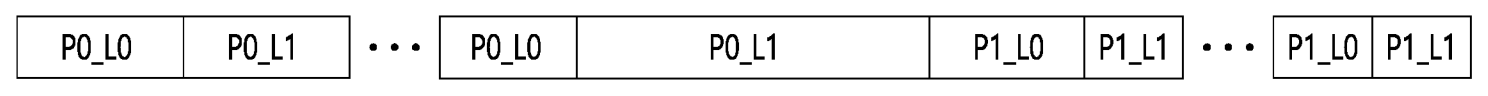

FIG. 7 illustrates a compressed bitstream including a plurality of regions according to another embodiment.

For example, it is assumed that a compressed bitstream is generated on the basis of JPEG-XS. A default compression unit in JPEG-XS is a precinct, and at least one class may exist for each precinct.

Referring to FIG. 7, assuming that each precinct includes two classes and representing a region having class Y of precinct X as PX_LY (i.e., X is the index of a precinct and Y is the index of a class), class 0 and class 1 of precinct 0 are represented by P0_L0 and P0_L1, respectively, and class 0 and class 1 of next precinct 1 are represented by P1_L0 and P1_L1, respectively. Referring to FIG. 7, when the compressed bitstream is viewed in each precinct or a domain, a particular class appears cyclically or repeatedly (a plurality of times) (P0_L0, P0_L1, ..., P0_L0, and P0_L1) in precinct 0, and a particular class appears cyclically or repeatedly (a plurality of times) (P1_L0, P1_L1, ..., P1_L0, and P1 L1) in next precinct 1. That is, one or more particular classes may be repeated in each precinct.

Referring back to FIG. 5, the encoder 1132 may divide the compressed bitstream into a plurality of regions having the same or similar characteristics (or features) by analysis and may set or assign a class for each region. That is, the encoder 1132 may classify the regions by class. The class may control the operation of the DS transmitter 1141, the DS receiver 1211, or the decoder 1231. For example, the DS transmitter 1141 may transmit a bitstream by allocating channels having different priorities according to the class of the bitstream. In another example, when an error occurs in transmitting the compressed bitstream, the DS receiver 1211 may determine whether to retransmit a region where the error occurs by referring to the class of the region. In still another example, when an error occurs in transmitting the compressed bitstream, the decoder 1231 may determine whether to perform reconstruction by referring to the class of each region.

When the class of each region is set, the encoder 1132 generates additional information about the compressed bitstream and inputs the additional information to the communication unit 1140. Hereinafter, the additional information will be described in detail.

The additional information may be referred to as information about a region of the bitstream or simply as bitstream information. Alternatively, the additional information may be referred to as information about a reconstruction method for each region.

For example, the additional information may include information about the class and a region of the compressed bitstream. An example of the additional information is shown in FIG. 8.

FIG. 8 illustrates additional information according to an embodiment.

Referring to FIG. 8, the additional information includes a set of information elements about respective regions. An information element about each region includes a combination of class information about the region, information about an offset position (in bytes) at which the region starts, where the additional information is a set of information elements about all the regions. Class information is, for example, M bits and indicates an index, such as 1, 2, and the like, and offset position information is, for example, N bits and indicates a byte position. Thus, an information element about each region may include (M+N) bits.

For example, in FIG. 8, a compressed bitstream is divided into four regions (first to fourth regions). A first information element about a first region is {0, 0 bytes}, a second information element about a second region is {1, 53 bytes}, a third information element about a third region is {2, 278 bytes}, and a fourth information element about a fourth region is {3,780 bytes}. Therefore, additional information may include a set of the first to fourth information elements, {0, 0 bytes}, {1, 53 bytes}, {2, 278 bytes}, and {3, 780 bytes}. Class information and offset position information of the example of additional information shown in FIG. 8 indicate that: the first region is class 0 and starts from 0 bytes; the second region is class 1 and starts from 53 bytes; the third region is class 2 and starts from 278 bytes; and the fourth region is class 3 and starts from 780 bytes. That is, according to the additional information, the first region is from 0 to 52 bytes, the second region is from 53 to 277 bytes, the third region is from 278 to 779 bytes, and the fourth region is from 780 bytes.

In another example, the additional information may include only class information about a compressed bitstream (or a region of the compressed bitstream). In this embodiment, since information about the position of a region is not separately provided, the additional information may be referred to as class information. The class information may be disposed as a prefix before the corresponding compressed bitstream or the region of the compressed bitstream. An example of this additional information is shown in FIG. 9.

FIG. 9 illustrates additional information and a compressed bitstream according to another embodiment.

Referring to FIG. 9, the compressed bitstream is divided into bitstreams having a predetermined size (e.g., 128 bits), and additional information (or class information) is disposed as a prefix before each of the divided bitstreams (first to fourth bitstreams (Bit Stream 1 to 4)). When a plurality of regions in each bitstream (or a data unit to be transmitted) belongs to different classes, a prefix is added by determining a representative class (e.g., a top class).

In still another example, the additional information may include information about a region of a compressed bitstream.

Hereinafter, a method of generating additional information will be described in detail.

According to an embodiment, additional information may be generated on the basis of a certain rule or unit.

For example, the encoder 1132 may generate additional information per picture. When the additional information includes class information, the encoder 1132 generates class information per picture. When a picture is generated at a certain period, additional information may be understood as also being generated at the certain period. The encoder 1132 inputs the additional information generated per picture to the DS transmitter 1141. The DS transmitter 1141 transmits the additional information to the DS receiver 1211 per picture. For the DS receiver 1211, the additional information is received or updated per picture.

In another example, the encoder 1132 may repeatedly generate additional information per each specified unit in a picture. Here, the specified unit in the picture may be a compression unit. For example, when the encoder 1132 compresses a picture using the JPEG XS codec, the encoder 1132 compresses the picture into units of one, two, or four lines. In this case, additional information may be repeatedly generated every one, two, or four lines in the picture. When the additional information includes class information, the encoder 1132 repeatedly generates the class information per each specified unit in the picture.

In this example, when the encoder 1132 compresses a picture using the JPEG XS codec, the encoder 1132 may repeatedly generate class information every compression of one, two, or four lines in the picture. Therefore, one piece of class information corresponds to one, two, or four lines in the picture. The encoder 1132 inputs the additional information repeatedly generated per specified unit to the DS transmitter 1141. The DS transmitter 1141 transmits the additional information to the DS receiver 1211 per specified unit. For the DS receiver 1211, the additional information is received or updated per specified unit.

In still another example, the encoder 1132 may generate additional information per chunk having a certain size. The encoder 1132 inputs the additional information generated per chunk having the certain size to the DS transmitter 1141. The DS transmitter 1141 transmits the additional information to the DS receiver 1211 per chunk. For the DS receiver 1211, the additional information is received or updated per chunk.

According to this embodiment, the encoder 1132 generates additional information according to a predetermined rule or period, inserts the generated additional information into a data stream, and transmits the data stream through the DS transmitter 1141. Accordingly, when the decoder 1231 is provided information regarding the predetermined rule or period with the encoder 1132 in advance, the decoder 1231 may detect the additional information from the data stream without receiving a separate signal from the encoder 1132. That is, the encoder 1132 does not need to separately generate information about an offset position at which the additional information is inserted in the data stream or a period in which the additional information is generated, thus preventing unnecessary waste of bit resources.

According to another embodiment, additional information may be generated irregularly without any rule. In this case, the encoder 1132 separately generates information about a period for generating (or transmitting) the additional information or information about an offset position at which the additional information is inserted (or updated) in a data stream and transmits the information to the DS transmitter 1141. The decoder 1231 may detect the additional information from the bitstream on the basis of the information about the period or the information about the offset position. The DS transmitter 1141 transmits the information about the period or the information about the offset position to the DS receiver 1211. The DS receiver 1211 receives or updates the additional information on the basis of the information about the period or the information about the offset position. In this case, the information about the period or the information about the offset position may be transmitted before the additional information.

According to still another embodiment, when compressed bitstreams are transmitted via separate channels, additional information is unnecessary and may thus not be transmitted.

Referring back to FIG. 5, upon receiving a data stream from the encoder 1132, the DS transmitter 1141 packetizes the data stream and transmits the data stream to the DS receiver 1211.

In one example, the data stream output by the encoder 1132 may include a compressed bitstream and additional information. Here, the additional information may include class information or may include class information and offset position information about a region.

In another example, the data stream output by the encoder 1132 may include a compressed bitstream, additional information, and information about an offset position at which the additional information is inserted in the bitstream. Here, the additional information may include class information or may include class information and offset position information about a region.

In still another example, the data stream output by the encoder 1132 may include a compressed bitstream, additional information, information about an offset position at which the additional information is inserted in the bitstream, and identification information for identifying the compressed bitstream and the additional information. The identification information is information used by the DS receiver 1211 to identify the compressed bitstream and the additional information in the data stream. Here, the additional information may include class information or may include class information and offset position information about a region.

The DS transmitter 1141 receives the data stream including at least one of a compressed bitstream, additional information, information about an offset position at which the additional information is inserted in the bitstream, and identification information from the encoder 1132, and the DS transmitter 1141 may pack the data stream, and transmits the data stream to the DS receiver 1211. Packing may be referred to as packetization.

Hereinafter, a method of packing a data stream by the DS transmitter 1141 will be described in detail.

In one example, a unit of packing (or transmitting) a data stream by the DS transmitter 1141 may be determined on the basis of class information. As described above, a compressed bitstream generated by the encoder 1132 is divided into a plurality of regions having a specified class.

The DS transmitter 1141 may identify class information about each region from the additional information obtained from the encoder 1132, may perform preprocessing of merging or aligning regions having the same class (i.e., by the same class unit) among the plurality of compressed regions, and may pack and transmit a data stream of each class. Preprocessing may be referred to as reordering.

Figure 10:
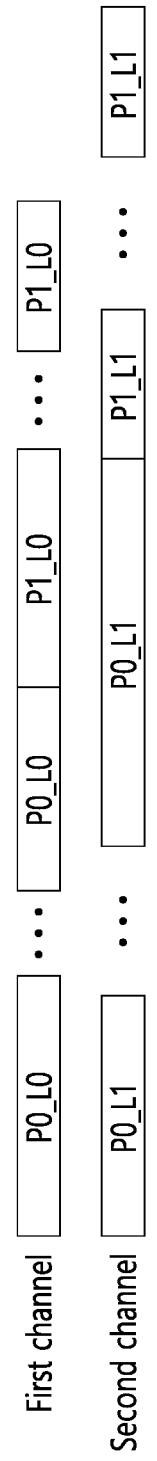
FIG. 10 illustrates a method of packing a data stream according to an embodiment.

FIG. 10 illustrates a method of packing a data stream according to an embodiment.

Referring to FIG. 10, in the case of a bitstream compressed by JPEG-XS, the DS transmitter 1141 may pack the stream per class of precincts and may transmit a packet of class 0 including P0_L0, . . . , P1_L0 and a packet of class 1 including P0_L1, . . . , P1 L1 through separate channels. Here, stream buffers of the encoder 1132 and the decoder 1231 may be separated in a form capable of receiving input from independent channels.

In this case, the encoder 1132 may store regions (i.e., a data stream) of the same class merged or aligned by preprocessing in the memory 1120 (or buffer), and the DS transmitter 1141 may pack the data stream stored in the memory 1120 (or buffer). Since the encoder 1132 directly performs the preprocessing, the DS transmitter 1141 does not need to identify class information about each region from the additional information. Further, since reordering of aligning bitstreams of the same class is already included in an encoding process of the encoder 1132, the decoder 1231 may predict or estimate reordering from information about the encoding. Therefore, the encoder 1132 does not need to separately transmit information about reordering to the decoder 1231.

Referring back to FIG. 5, a unit of packing (or transmitting) a data stream by the DS transmitter 1141 may be a predetermined fixed size regardless of the class of a bitstream compressed by the encoder 1132. The DS transmitter 1141 may sequentially pack data streams according to a predetermined packet size.

In another example, a unit of packing (or transmitting) a data stream by the DS transmitter 1141 may be determined on the basis of the attributes or characteristics of information included in the data stream. For explanation of this embodiment, it is assumed, for example, that a data stream includes a compressed bitstream and additional information.

In one aspect, the DS transmitter 1141 may generate a packet by inserting the additional information into a header part of a packet and inserting the compressed bitstream related to the additional information into a body part of the same packet. That is, pieces of information having different attributes or characteristics are separately inserted into different positions in the same packet.

For example, assuming that the DS transmitter 1141 generates a packet in an IEEE 802.11-series PPDU format as shown in FIG. 4, the DS transmitter 1141 may insert additional information into one of L-SIG, SIG A, VHT-SIG A, VHT-SIG B, RL-SIG, HE-SIG A, and HE SIG B fields and may insert a compressed bitstream into a DATA field. In the same manner, the DS transmitter 1141 may generate a packet by separately inserting various pieces of information (additional information, a compressed bitstream, information about an offset position at which the additional information is inserted, and identification information for identifying the compressed bitstream and the additional information) that can be included in a data stream into particular positions in a single packet.

In another aspect, the DS transmitter 1141 may insert different pieces of information into different packets and transmit the same. For example, the DS transmitter 1141 may generate and transmit additional information as a first packet and may generate and transmit a compressed bitstream related to the additional information as a second packet. In this case, the additional information and the compressed bitstream may be inserted into data fields of the first packet and the second packet, respectively. In the same manner, the DS transmitter 1141 may generate a packet by separately inserting various pieces of information (additional information, a compressed bitstream, information about an offset position at which the additional information is inserted, and identification information for identifying the compressed bitstream and the additional information) that can be included in a data stream into data fields of different packets.

Alternatively, the DS transmitter 1141 may transmit a compressed bitstream and additional information to the DS receiver 1211 at different transmission timings or through different packets. For example, the DS transmitter 1141 may transmit the additional information first and may then transmit the compressed bitstream. Since the additional information controls a decoding operation mode when an error occurs in transmitting the compressed bitstream, the wireless stream reception device 1200 first receives the additional information and then decodes the compressed bitstream on the basis of the additional information.

When the additional information is irregularly or aperiodically transmitted, the DS transmitter 1141 may transmit information about the period of the additional information or information about an offset position before transmitting the additional information.

The DS transmitter 1141 may transmit compressed bitstreams through wireless channels having different transmission error rates according to the class of the bitstreams. For example, the DS transmitter 1141 may transmit a bitstream of class 0 through a first wireless channel having a very low transmission error rate and may transmit a bitstream of class 1 through a second wireless channel having a transmission error rate relatively higher than that of the first wireless channel.

Hereinafter, the operation of the wireless stream reception device 1200 is described.

The DS receiver 1211 receives packets from the DS transmitter 1141. Each packet may include at least one of additional information, a compressed bitstream, information about an offset position at which the additional information is inserted, or identification information for identifying the compressed bitstream and the additional information. That is, the DS receiver 1211 receives at least one of additional information, a compressed bitstream, information about an offset position at which the additional information is inserted, or identification information for identifying the compressed bitstream and the additional information through successively received packets.

The identification information is transmitted first among the above pieces of information and helps the DS receiver 1211 to identify whether information included in a currently received packet is additional information or a compressed bitstream. Alternatively, the DS receiver 1211 may identify whether the information included in the currently received packet is additional information or a compressed bitstream according to a procedure previously agreed with the DS transmitter 1141 without depending on the identification information.

The DS receiver 1211 demodulates and decodes a received packet. The decoding operation of the DS receiver 1211 means decoding of the received packet and is different from the operation of the decoder 1231 decoding a compressed bitstream. When the packet is transmitted through a deteriorated wireless channel, the DS receiver 1211 may fail to demodulate and decrypt the received packet. The DS receiver 1211 may determine the failure as a packet transmission error. For example, it is assumed that a transmission error occurs as illustrated in FIG. 11.

Figure 11:
FIG. 11 illustrates the occurrence of a transmission error according to an embodiment.

FIG. 11 illustrates the occurrence of a transmission error according to an embodiment.

Referring to FIG. 11, the DS transmitter 1141 sequentially packs and transmits additional information (shown as "info" in FIG. 11) including class information about each region, a bitstream corresponding to class 0, a bitstream corresponding to class 1, a bitstream corresponding to class 2, and a bitstream corresponding to class 0. When the additional information is successfully transmitted but a transmission error occurs in a rear portion of a bitstream packet corresponding to class 0 or a front portion of a bitstream packet corresponding to class 1, the DS receiver 1211 may fail to demodulate and decode the portions.

Likewise, when a transmission error occurs in a middle portion of a bitstream packet corresponding to class 2, the DS receiver 1211 may fail to demodulate and decode the portion.

Even though failing to demodulate and decode a packet, the DS receiver 1211 may store the received packet in a separate buffer and may reuse the packet in subsequent error recovery. That is, the DS receiver 1211 may store a packet having a transmission error in a buffer or a memory without discarding the packet, and may transmit the packet to the decoder 1231 when failing to receive a normal packet.

When failing to demodulate and decode a packet, the DS receiver 1211 determines whether to request the DS transmitter 1141 to retransmit the packet on the basis of the additional information. That is, since the impact of a transmission error on the operation of the decoder 1231 varies depending on the class of a bitstream, the DS receiver 1211 considers the additional information when determining priority in requesting retransmission of a packet having a transmission error and/or whether to drop the packet.

For example, in FIG. 11, according to a method of determining whether to request retransmission of a packet, the DS receiver 1211 compares the classes of bitstreams having a transmission error on the basis of the class information included in the additional information, and determines a packet including the bitstream corresponding to class 1 as an object to be preferentially retransmitted when the bitstream corresponding to class 1 has higher importance. The DS receiver 1211 transmits a signal for requesting retransmission of the packet determined as the object to be retransmitted to the DS transmitter 1141. Accordingly, it is possible to receive a bitstream of a class having high importance with no errors if possible, and it is possible to maintain the characteristic of low latency. Here, the signal for requesting retransmission of the packet may include indication information indicating the packet or a bitstream included in the packet.

The DS receiver 1211 transmits at least some of a normally received packet (or bitstream), a packet (or bitstream) having a transmission error, a packet dropped due to a transmission error, and a packet received by a retransmission request to the decoder 1231. Here, the DS receiver 1211 may also transmit information about whether an error occurs in each packet and class information about a bitstream to the decoder 1231. Examples of information about whether an error occurs in each packet and class information about a bitstream are shown in FIG. 12.

FIG. 12 illustrates information about whether an error occurs and class information about a bitstream according to an example.

Referring to FIG. 12, a field indicating the occurrence of an error is depicted, where the field is equal to 0 to indicate that no error has occurred, and where the field is equal to 1 to indicate that an error has occurred in transmission of a bitstream. Here, class information about each bitstream is also indicated. Accordingly, the decoder 1231 may determine whether to decode a bitstream in consideration of information about a transmission error and class information about the bitstream.

Information about whether an error occurs and class information about a bitstream may be generated per packet to be input to the decoder 1231, or may be generated by the unit of a predetermined fixed size to be input to the decoder 1231.

The decoder 1231 may recognize in advance a mode in which the decoder 1231 decodes a bitstream on the basis of information about whether an error occurs in transmission of each packet and class information about the bitstream.

In one example, when a packet has a transmission error but the class of a bitstream thereof is decodable using previous information, the decoder 1231 may disregard currently transmitted information and may perform decoding using information previously stored by the decoder 1231.

In another example, when a packet has a transmission error and causes a serious impact on the quality of a reconstructed picture if lost, the decoder 1231 may perform picture reconstruction through a concealment algorithm.

In still another example, when a packet has a transmission error and does not cause a significant impact on the quality of a reconstructed picture even if the packet is lost, the decoder 1231 may reconstruct the packet on the basis of an original decoding rule.

When bitstream class information is used, a bitstream having a transmission error may be decoded by a different method according to the class thereof, thereby optimizing the quality of a reconstructed picture.

Hereinafter, a method of transmitting a data stream robust to an error in a low-latency wireless compressed data stream transmission system and a method of receiving the same will be described in detail.

Figure 13:
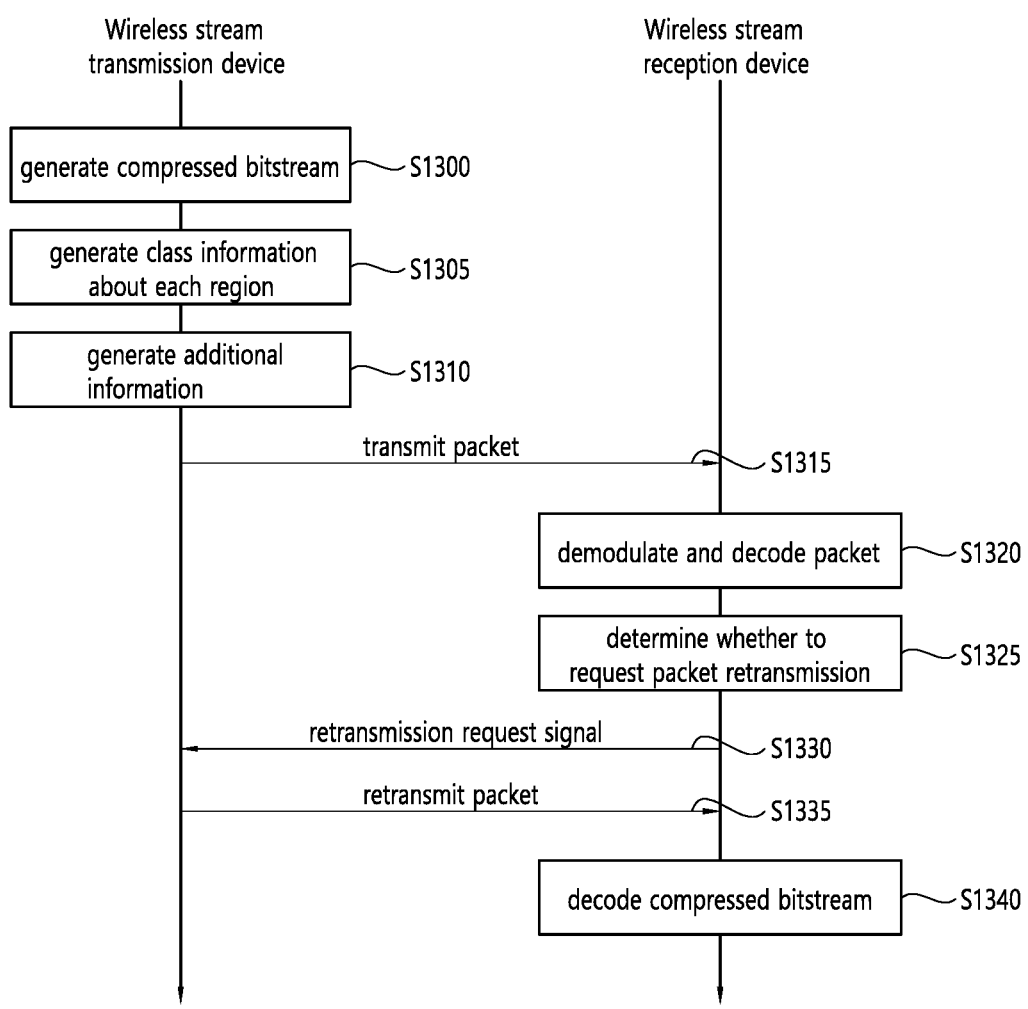
FIG. 13 is a flowchart illustrating a method of transmitting a data stream and a method of receiving the same according to an embodiment.

FIG. 13 is a flowchart illustrating a method of transmitting a data stream and a method of receiving the same according to an embodiment.

Referring to FIG. 13, the wireless stream transmission device 1100 compresses or encodes input media (an audio, a video, an image, a picture, or at least one combination thereof) to generate a compressed bitstream (S1300).

For example, when the input media is an image, the generated compressed bitstream may be a bitstream compressed in the JPEG-XS format, or other image encoding format. In this case, the encoder 1132 may be a JPEG-XS codec. The JPEG-XS codec is a codec defined in the ISO/IEC 21122 standard for low-latency and low-power image compression formats optimized for real-time streaming. In another example, when the input media is a video, the generated compressed bitstream may be a data stream in the HEVC (or H.265) format, or other video encoding format.

There are various formats for compressing or encoding the input media.

Various image compression/encoding schemes in addition to the JPEG-XS format may also be used for compressing or encoding the image according to this example, and this embodiment includes bitstreams generated by such various embodiments.

In another example, when the input media is a picture or video, the output compressed bitstream may be a data stream in the JPEG-XS format or an HEVC (or H.265) format. Various picture/video compression or encoding schemes including the JPEG-XS format or HEVC (or H.265) format may be used for compressing or encoding the picture or video according to this example, and this embodiment includes bitstreams generated by such various embodiments.

The wireless stream transmission device 1100 may divide the compressed bitstream into a plurality of regions having the same or similar characteristics (or features) and may set or assign a class for each region (S1305), a specific example of which is illustrated above in FIG. 6. When an error occurs in transmitting the compressed bitstream, the wireless stream reception device 1200 may determine whether to retransmit a region where the error occurs by referring to the class of the region. Alternatively, when an error occurs in transmitting the compressed bitstream, the wireless stream reception device 1200 may determine whether to perform reconstruction by referring to the class of each region.

When the class of each region is set, the wireless stream transmission device 1100 generates additional information about the compressed bitstream (S1310). Hereinafter, the additional information will be described in detail.

The additional information may be referred to as information about a region of the bitstream or simply as bitstream information. Alternatively, the additional information may be referred to as information about a reconstruction method for each region.

For example, the additional information may include information about the class and a region of the compressed bitstream. An example of the additional information is shown in FIG. 8.

In another example, the additional information may include only class information about a compressed bitstream (or a region of the compressed bitstream). In this embodiment, since information about the position of a region is not separately provided, the additional information may be referred to as class information. The class information may be disposed as a prefix before the compressed bitstream or the region of the compressed bitstream. An example of this additional information is shown in FIG. 9.

In still another example, the additional information may include information about a region of a compressed bitstream.

Hereinafter, a method of generating and transmitting additional information will be described in detail.

According to an embodiment, the wireless stream transmission device 1100 may generate additional information on the basis of a certain rule or unit and may transmit the additional information to the wireless stream reception device 1200.

In one example, the wireless stream transmission device 1100 may generate additional information per picture. When the additional information includes class information, the wireless stream transmission device 1100 generates class information per picture. When a picture is generated at a certain period, additional information may be understood as also being generated at the certain period.

In another example, the wireless stream transmission device 1100 may repeatedly generate additional information per specified unit in a picture. Here, the specified unit in the picture may be a compression unit. For example, when the wireless stream transmission device 1100 compresses a picture using the JPEG XS codec, the wireless stream transmission device 1100 compresses one picture into units of four lines. In this case, additional information may be repeatedly generated every four lines in the picture. When the additional information includes class information, the wireless stream transmission device 1100 repeatedly generates the class information per specified unit in the picture. In this example, when the wireless stream transmission device 1100 compresses a picture using the JPEG XS codec, the wireless stream transmission device 1100 may repeatedly generate class information every compression of four lines in the picture. Therefore, one piece of class information corresponds to four lines in the picture.

In still another example, the wireless stream transmission device 1100 may generate additional information per chunk having a certain size.

According to this embodiment, the wireless stream transmission device 1100 generates additional information according to a predetermined rule or period. Accordingly, when the wireless stream transmission device 1100 is provided with the predetermined rule or period also provided to the wireless stream reception device 1200 in advance, the wireless stream reception device 1200 may detect the additional information from the bitstream without receiving a separate signal from the wireless stream transmission device 1100. That is, the wireless stream transmission device 1100 does not need to separately generate information about an offset position at which the additional information is inserted in the bitstream or a period in which the additional information is generated, thus preventing unnecessary waste of bit resources.

According to another embodiment, the wireless stream transmission device 1100 may irregularly generate additional information without any rule. In this case, the wireless stream transmission device 1100 may separately generate information about a period for generating (or transmitting) the additional information or information about an offset position at which the additional information is inserted (or updated) in the bitstream. The wireless stream reception device 1200 may detect the additional information from the bitstream on the basis of the information about the period or the information about the offset position.

According to still another embodiment, when compressed bitstreams are transmitted via separate channels, additional information is unnecessary and may thus not be transmitted.

The data stream may include the compressed bitstream and the additional information. Here, the additional information may include class information or may include class information and offset position information about a region.

Alternatively, the data stream may include the compressed bitstream, the additional information, and information about an offset position at which the additional information is inserted in the bitstream. Here, the additional information may include class information or may include class information and offset position information about a region.

Alternatively, the data stream may include the compressed bitstream, the additional information, the information about the offset position at which the additional information is inserted in the bitstream, and identification information for identifying the compressed bitstream and the additional information. Here, the additional information may include class information or may include class information and offset position information about a region.

The wireless stream transmission device 1100 packs the data stream and transmits the data stream to the wireless stream reception device 1200 (S1315).

In one example, a unit of packing (or transmitting) a data stream by the wireless stream transmission device 1100 may be determined on the basis of class information. As described above, the compressed bitstream generated by the wireless stream transmission device 1100 is divided into a plurality of regions having a specified class.

The wireless stream transmission device 1100 may perform preprocessing of merging or aligning regions having the same class (i.e., by the same class unit) among the plurality of compressed regions and may then pack and transmit a data stream of each class. Preprocessing may be referred to as reordering.

A unit of packing (or transmitting) a data stream by the wireless stream transmission device 1100 may be a predetermined fixed size regardless of the class of the compressed bitstream. The wireless stream transmission device 1100 may sequentially pack data streams according to a predetermined packet size.

In another example, a unit of packing (or transmitting) a data stream by the wireless stream transmission device 1100 may be determined on the basis of the attributes or characteristics of information included in the data stream. For explanation of this embodiment, it is assumed, for example, that the data stream includes the compressed bitstream and the additional information.

In one aspect, the wireless stream transmission device 1100 may generate a packet by inserting the additional information into a header part of a packet and inserting the compressed bitstream related to the additional information into a body part of the same packet. That is, pieces of information having different attributes or characteristics are separately inserted into different positions in the same packet. For example, assuming that the wireless stream transmission device 1100 generates a packet in an IEEE 802.11-series PPDU format as shown in FIG. 4, the wireless stream transmission device 1100 may insert additional information into one of L-SIG, SIG A, VHT-SIG A, VHT-SIG B, RL-SIG, HE-SIG A, and HE SIG B fields and may insert a compressed bitstream into a DATA field. In the same manner, the wireless stream transmission device 1100 may generate a packet by separately inserting various pieces of information (additional information, a compressed bitstream, information about an offset position at which the additional information is inserted, and identification information for identifying the compressed bitstream and the additional information) that can be included in a data stream into particular positions in a single packet.

In another aspect, the wireless stream transmission device 1100 may insert different pieces of information into different packets and transmit the same. For example, the wireless stream transmission device 1100 may generate and transmit additional information as a first packet and may generate and transmit a compressed bitstream related to the additional information as a second packet. In this case, the additional information and the compressed bitstream may be inserted into data fields of the first packet and the second packet, respectively. In the same manner, the wireless stream transmission device 1100 may generate a packet by separately inserting various pieces of information (additional information, a compressed bitstream, information about an offset position at which the additional information is inserted, and identification information for identifying the compressed bitstream and the additional information) that can be included in a data stream into data fields of different packets.

Alternatively, the wireless stream transmission device 1100 may transmit a compressed bitstream and additional information to the DS receiver 1211 at different transmission timings or through different packets. For example, the wireless stream transmission device 1100 may transmit the additional information first and may then transmit the compressed bitstream. Since the additional information controls a decoding operation mode when an error occurs in transmitting the compressed bitstream, the wireless stream reception device 1200 first receives the additional information and then decodes the compressed bitstream on the basis of the additional information.

When the additional information is irregularly or aperiodically transmitted, the wireless stream transmission device 1100 may transmit information about the period of the additional information or information about an offset position before the additional information.

The wireless stream transmission device 1100 may transmit compressed bitstreams through wireless channels having different transmission error rates according to the class of the bitstreams. For example, the wireless stream transmission device 1100 may transmit a bitstream of class 0 through a first wireless channel having a very low transmission error rate and may transmit a bitstream of class 1 through a second wireless channel having a transmission error rate relatively higher than that of the first wireless channel.

The wireless stream reception device 1200 receives packets from the wireless stream transmission device 1100 (S1315). Each packet may include at least one of additional information, a compressed bitstream, information about an offset position at which the additional information is inserted, and identification information for identifying the compressed bitstream and the additional information. That is, the wireless stream reception device 1200 receives at least one of additional information, a compressed bitstream, information about an offset position at which the additional information is inserted, and identification information for identifying the compressed bitstream and the additional information through successively received packets.

The identification information is transmitted first among the above pieces of information and helps the wireless stream reception device 1200 to identify whether information included in a currently received packet is additional information or a compressed bitstream. Alternatively, the wireless stream reception device 1200 may identify whether the information included in the currently received packet is additional information or a compressed bitstream according to a procedure previously agreed with the wireless stream transmission device 1100 without depending on the identification information.

The wireless stream reception device 1200 demodulates and decodes a received packet to output a data stream including a compressed bitstream and additional information about the compressed bitstream (S1320). From the perspective of communication, the decoding operation of the wireless stream reception device 1200 means decoding of the received packet and is different from an operation of decoding or reconstructing a compressed bitstream. When the packet is transmitted through a deteriorated wireless channel, the wireless stream reception device 1200 may fail to demodulate and decrypt the received packet. The wireless stream reception device 1200 may determine the failure as a packet transmission error.

Even though failing to demodulate and decode a packet, the wireless stream reception device 1200 may store the received packet in a separate buffer and may reuse the packet in subsequent error recovery. That is, the wireless stream reception device 1200 may store a packet having a transmission error in a buffer or a memory without discarding the packet, and may use the packet for decoding the bitstream when failing to receive a normal packet.

When failing to demodulate and decode a packet, the wireless stream reception device 1200 determines whether to request the wireless stream transmission device 1100 to retransmit the packet on the basis of the additional information (S1325). That is, since the impact of a transmission error on the operation of the wireless stream reception device 1200 decoding the bitstream varies depending on the class of a bitstream, the wireless stream reception device 1200 considers the additional information when determining priority in requesting retransmission of a packet having a transmission error and/or whether to drop the packet.

For example, the wireless stream reception device 1200 compares the classes of bitstreams having a transmission error on the basis of the class information included in the additional information and determines a packet including a bitstream corresponding to a class having high importance as an object to be preferentially retransmitted. The wireless stream reception device 1200 transmits a signal for requesting retransmission of the packet determined as the object to be retransmitted to the wireless stream transmission device 1100 (S1330). The wireless stream transmission device 1100 may retransmit the packet that is the object to be retransmitted to the wireless stream reception device 1200 in response to the signal for requesting retransmission (S1335).

Accordingly, it is possible to receive a bitstream of a class having high importance with no errors if possible, and it is possible to maintain the characteristic of low latency. Here, the signal for requesting retransmission of the packet may include indication information indicating the packet or a bitstream included in the packet.

The wireless stream reception device 1200 performs decoding using at least some of a normally received packet (or bitstream), a packet (or bitstream) having a transmission error, a packet dropped due to a transmission error, and a packet received by a retransmission request (S1340). Here, the wireless stream reception device 1200 may use information about whether an error occurs in each packet and class information about a bitstream. Examples of information about whether an error occurs in each packet and class information about a bitstream are shown in FIG. 12.

The wireless stream reception device 1200 may recognize in advance a mode in which the wireless stream transmission device 1100 decodes a bitstream on the basis of information about whether an error has occurred in transmission of each packet and class information about the bitstream.

In one example, when a packet has a transmission error but the class of the corresponding bitstream is decodable using previous information, the wireless stream reception device 1200 may disregard currently transmitted information and may perform decoding using information previously stored by the wireless stream reception device 1200.

In another example, when a packet has a transmission error and causes a serious impact on the quality of a reconstructed picture if lost, the wireless stream reception device 1200 may perform picture reconstruction through a concealment algorithm.

In still another example, when a packet has a transmission error and does not cause a significant impact on the quality of a reconstructed picture even though lost, the wireless stream reception device 1200 may reconstruct the received packet on the basis of an original decoding rule.

When bitstream class information is used, a bitstream having a transmission error may be decoded by a different method according to the class thereof, thereby optimizing the quality of a reconstructed picture.

Since the device and method for receiving the wireless stream or the device and method for transmitting the wireless stream according to the foregoing embodiments of the disclosure do not necessarily require all of the components or operations illustrated above, the device and method for receiving the wireless stream or the device and method for transmitting the wireless stream may be implemented by including some or all of the foregoing components or operations. Further, the foregoing embodiments of the device and method for receiving the wireless stream or the device and method for transmitting the wireless stream may be implemented in combination with each other. In addition, the foregoing components or operations are not necessarily implemented in the order described above, but it is also possible to implement the components or operations in reverse order.

The foregoing description has been made merely to illustrate the technical idea of the disclosure, and those skilled in the art to which the disclosure pertains will recognize that various changes and modifications of the embodiments described above can be made without departing from the scope and spirit of the disclosure. Therefore, the embodiments of the disclosure described above can be implemented separately or in combination with each other.

The embodiments disclosed herein are provided not to limit the technical idea of the disclosure but to describe the disclosure, and the scope of the technical idea of the disclosure should not be limited to these embodiments. The scope of the disclosure should be interpreted by the following claims, and all technical ideas within the scope of equivalents thereto should be construed as being included in the scope of the disclosure.

What is claimed is:

1. A device for transmitting data, the device comprising:
an encoder configured to:
generate a compressed bitstream by encoding input media, wherein the compressed bitstream is divided into a plurality of regions;
generate additional information about the compressed bitstream, wherein the additional information comprises class information for each region which indicates an importance of each region, and wherein the plurality of regions of the compressed bitstream are ordered in a repeating sequential order according to class information of the regions, wherein the additional information is generated based on a predetermined rule or period, wherein the device agrees on the predetermined rule or period with a reception device in advance, wherein the additional information is detected from the compressed bitstream without a separate signal including information on offset position at which the additional information is inserted in the compressed bitstream or period in which the additional information is generated; and generate a data stream (DS) comprising the additional information and the compressed bitstream; and a DS transmitter configured to:
generate a packet by preprocessing process of merging or aligning the regions having the same class in the class information and packing the data stream by class in the class information;

transmit a plurality of packets including the generated packet to the reception device; and retransmit at least some of the plurality of packets due to transmission error, wherein the retransmitted packets are identified based on the class information.

2. The device of claim 1, wherein the importance of the regions of the compressed bitstream of the retransmitted packets is higher than the importance of the regions of the compressed bitstream of the packets of the plurality of packets which are not retransmitted.

3. The device of claim 1, wherein the DS transmitter is further configured to generate the packet by sequentially packing the data stream according to a fixed packet size.

4. The device of claim 1, wherein the DS transmitter is further configured to determine a particular wireless channel for transmitting the packet among a plurality of wireless channels based on the class information.

5. The device of claim 1, wherein the DS transmitter is further configured to transmit the additional information before transmission of the compressed bitstream.

6. The device of claim 1, wherein based on the input media being an image, the compressed bitstream is a data stream compressed in a JPEG-XS format which is defined for low-latency and low-power image compression formats optimized for real-time streaming, and based on the input media being a video, the compressed bitstream is a data stream compressed in a High Efficiency Video Coding (HEVC) format.

7. A method for transmitting data, the method comprising:
generating a compressed bitstream by encoding input media, wherein the compressed bitstream is divided into a plurality of regions;

generating additional information about the compressed bitstream, wherein the additional information comprises class information for each region which indicates an importance of each region, and wherein the plurality of regions of the compressed bitstream are ordered in a repeating sequential order according to class information of the regions wherein the additional information is generated based on a predetermined rule or period, wherein the device agrees on the predetermined rule or period with a reception device in advance, wherein the additional information is detected from the compressed bitstream without a separate signal including information on offset position at which the additional information is inserted in the compressed bitstream or period in which the additional information is generated;

generating a data stream (DS) comprising the additional information and the compressed bitstream;

generating a packet by preprocessing process of merging or aligning the regions having the same class in the class information and packing the data stream by class in the class information;

transmitting a plurality of packets including the generated packet to the reception device; and retransmitting at least some of the plurality of packets due to transmission error, wherein the retransmitted packets are identified based on the class information.

8. The method of claim 7, wherein the importance of the regions of the compressed bitstream of the retransmitted packets is higher than the importance of the regions of the compressed bitstream of the packets of the plurality of packets which are not retransmitted.

9. The device of claim 7, wherein based on the input media being an image, the compressed bitstream is a data stream compressed in a JPEG-XS format which is defined for low-latency and low-power image compression formats optimized for real-time streaming, and based on the input media being a video, the compressed bitstream is a data stream compressed in a High Efficiency Video Coding (HEVC) format.

* * * * *